United States Patent
Van Steveninck

[15] 3,702,540
[45] Nov. 14, 1972

[54] APPARATUS AND METHOD FOR BURYING PIPELINE

[72] Inventor: Johannes Van Steveninck, Rijswijk, Netherlands

[73] Assignee: Shell Oil Company, New York, N.Y.

[22] Filed: Oct. 30, 1970

[21] Appl. No.: 85,521

[52] U.S. Cl. ..........................61/72.4, 37/63, 37/78
[51] Int. Cl. ............................F16l 1/00, E02f 5/02
[58] Field of Search .............61/72.4, 72.1; 37/63, 78

[56] References Cited

UNITED STATES PATENTS

| | | | |
|---|---|---|---|
| 2,693,085 | 11/1954 | Salnikov | 61/72.4 |
| 2,755,632 | 7/1956 | Hauber | 61/72.4 |
| 3,217,499 | 11/1965 | Ishiki | 61/72.4 |

FOREIGN PATENTS OR APPLICATIONS

| | | | |
|---|---|---|---|
| 1,372,743 | 1964 | France | 61/72.4 |

Primary Examiner—Jacob Shapiro
Attorney—Harold L. Denkler and Theodore E. Bieber

[57] ABSTRACT

An apparatus for burying a pipeline in the sea bed by fluidizing the bottom material so that the pipeline sinks into the sea bed under its own weight comprises a number of pipes provided with fluidization nozzles along their length for injecting fluid into the sea bed. The pipes are slidably mounted on the underside of the pipeline and pulled along the pipeline as it is laid from a barge.

3 Claims, 3 Drawing Figures

J. Van Steveninck
INVENTOR.

BY
ATTORNEY

PATENTED NOV 14 1972

J. Van Steveninck
INVENTOR.

BY Theodore E. Bieber

ATTORNEY

APPARATUS AND METHOD FOR BURYING PIPELINE

BACKGROUND OF THE INVENTION

1. Field of the Invention

The invention relates to an apparatus and method for burying a pipeline in the bottom of a body of water by fluidization of the bottom material.

2. Description of the Prior Art

The conventional method for burying a pipeline in the bottom of a body of water comprises making a trench, laying the pipeline in the trench, and allowing the trench to fill up again. This is a rather complicated and expensive method, which has the disadvantage that the trench often fills with mud before the pipeline can be sunk into the trench.

A copending commonly assigned application of P. J. DeGeeter, Ser. No. 40,407, filed May 25, 1970, teaches a method of burying a subsea pipeline in which the sea bottom material is fluidized so that it has the properties of a liquid into which the pipeline will sink under its own weight. Thus a trench need not be formed to bury the pipeline.

SUMMARY OF THE INVENTION

It is an object of the invention to provide an embodiment of an apparatus adapted to be used according to the teaching of DeGeeter which is of a very simple and attractive construction and to provide a method for burying a pipeline by means of the last mentioned apparatus.

The apparatus according to the invention comprises plurality of parallel pipes having along their length a number of fluidization openings or nozzles, said pipes being secured to a number of yokes adapted to fit around and slide along the pipeline to be buried, and means for supplying a fluidization fluid to each of said pipes.

Each yoke, in side view, preferably has the shape of a horse shoe.

The invention further comprises a method for laying a pipeline from a barge on the bottom of a body of water and burying the pipeline in the said bottom at the same time, comprising lowering the pipeline from the barge and at the same time pulling along the pipeline an apparatus comprising a plurality of parallel pipes having along their length a large number of fluidization openings or nozzles, said pipes being secured to a number of yokes adapted to fit around and slide along the pipeline, and supplying a fluidization fluid to each of said pipes so that the said fluidization fluid will pass through the said fluidization openings or nozzles and will fluidize the bottom material adjacent to the pipeline, causing the pipeline to sink into the fluidized bottom material.

BRIEF DESCRIPTION OF THE DRAWINGS

The invention will be explained with reference to the drawings wherein.

DESCRIPTION OF A PREFERRED EMBODIMENT

Figure 1:
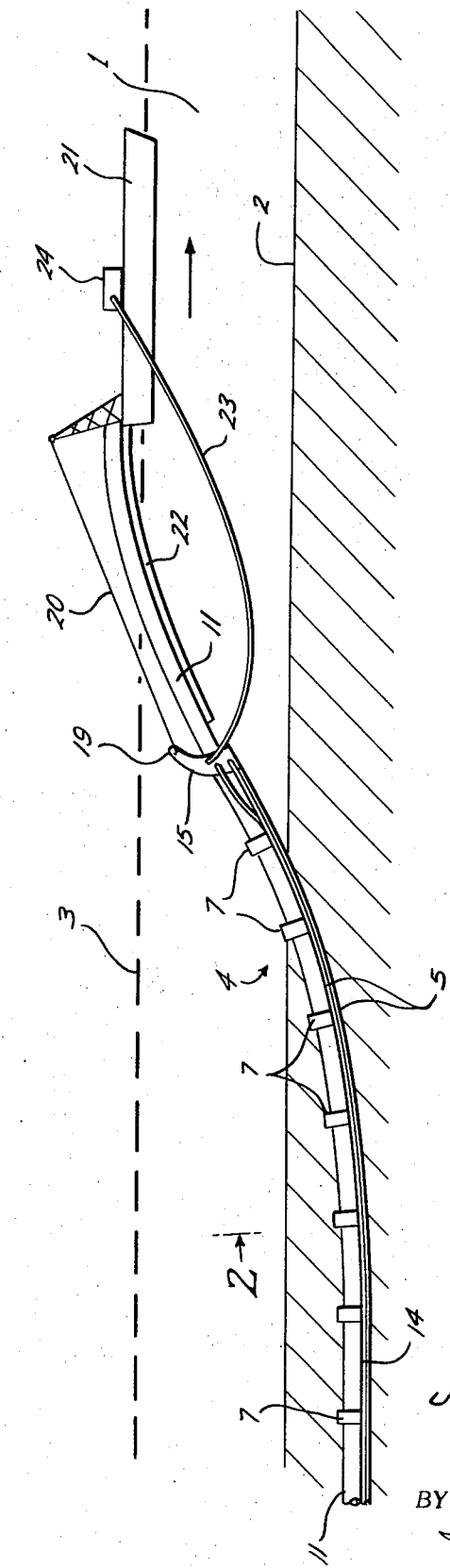
FIG. 1 shows a side view of the apparatus according to the invention while in use.
Figure 2:
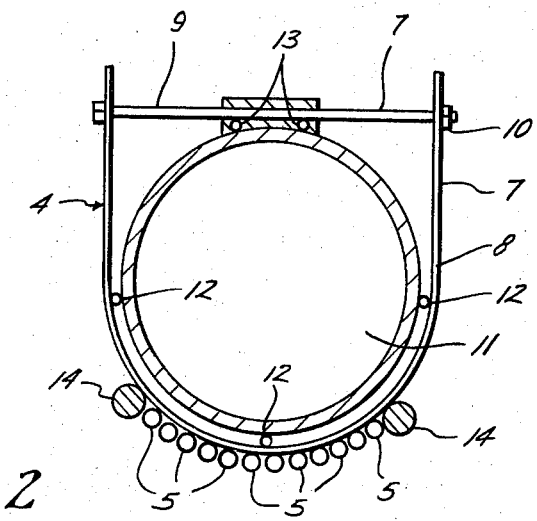
FIG. 2 shows a cross-section of the apparatus according to the invention along the line 2 — 2 of FIG. 1.
Figure 3:
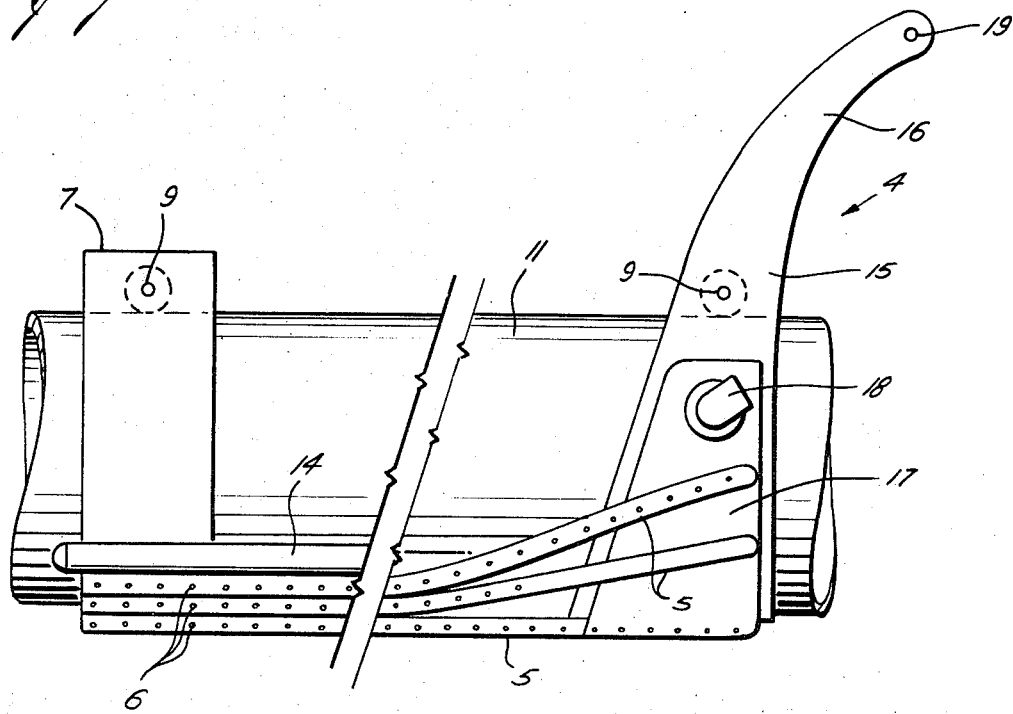
FIG. 3 shows a side view of the apparatus according to the invention.

In the FIG. 1 the bottom of the body of water 1 is indicated by the reference numeral 2 and the water surface by the numeral 3. The apparatus according to the invention is generally indicated by the numeral 4. The apparatus 4 comprises a plurality of pipes 5, preferably made of a suitable metal, provided along their length with a large number of fluidization openings or nozzles 6. The pipes 5 are fixedly secured to means for axially moveably mounting the pipes 5 on a pipeline 11 such as yokes 7. Each yoke 7 may comprise a curved metal strip 8 (FIG. 2), of which the ends are held by a preferably releaseable closing means, such as a bolt 9 cooperating with nut 10. As will be clear from FIG. 2 the yoke 7 in side view will have the shape of a horseshoe with a continuous curved bottom portion and a pair of substantially straight, parallel arms or side members extending upwardly from the curved bottom portion. The yoke 7 which is closed by closing means 9 fits around and is slidable along pipeline 11 to be buried. In order to allow the yokes 7 to slide along the pipeline 11, each yoke 7 and closing means 9 is provided with anti-friction bearings such as ball-bearings or roller-bearings, schematically indicated by reference numerals 12 and 13 as can be seen in FIGS. 1 and 3 the straight, side members of the yokes 7 which extend upwardly from the curved bottom portion are laterally unsupported in the direction of the longitudinal axis of the apparatus 4. The yokes 7 are structurally independent of one another except for connecting members, such as pipes 5, connected to the curved bottom portion of the yoke.

Heavy ballast bars, for example made of solid steel, for weighting the bottom of the apparatus 4 are indicated by reference numeral 14. These ballast bars 14 are fixedly secured to the strips 8 of the yokes 7. At the front end of the apparatus 4, a yoke 15 of a somewhat modified design is arranged. This yoke differs from the yokes 7 in that it is provided with an extension 16 and that it carries a fluid distribution chamber 17 having at each side an inlet 18 for the supply of fluidization fluid. The pipes 5 are in communication with the distribution chamber 17. The extension 16 of the yoke 15 is provided with means such as an eye 19 for securing a pulling cable 20 thereto.

The use of the apparatus according to the invention will be described with reference to FIG. 1.

From a laying barge 21, moving along the desired course, a pipeline 11 is lowered in a known manner, for example by passing the pipeline along a stinger 22. While the pipeline 11 is being lowered to the bottom 2, the apparatus 4 is pulled along the pipeline 11 by means such as cable 20 which is secured to the barge 21 by any suitable fastening means. At the same time a fluidization fluid under pressure is supplied through inlets 18 into distribution chamber 17. From chamber 17 the said fluid flows into the pipes 5 and then through the openings or nozzles 6 into the bottom 2 adjacent to the pipeline 11. This causes the bottom material adjacent to the pipeline 11 to be fluidized so that under the weight of the pipeline 11 and the weight of the apparatus 4 together with the weight of the ballast bars 14, the pipeline 11 will sink into the fluidized bottom material until it has reached the desired depth. The fluidization fluid is preferably water, for example, seawater. Instead it is possible to use a mixture of water and air, if desired.

The fluidization fluid can be supplied to the inlet 18 from a pump 24 on the barge 21 by means of a hose 23 arranged between the barge 21 and the inlet 18.

Instead it is possible to arrange pumps (not shown) in the apparatus 4, said pumps being adapted to suck in water present near the pipeline and transporting the water under pressure to the pipes 5. In order to speed up the sinking of the pipeline 11 into the fluidized bottom material, it is possible to raise its weight by ballasting the pipeline 11 by introducing a suitable liquid, for example water, into it.

As explained in the above-mentioned commonly assigned copending patent application of P.J. DeGeeter, the bottom material should be fluidized over a certain minimum length which is defined by the formula:

$$l = \sqrt[4]{\frac{CEIz}{q}}$$

wherein
$E$ = modulus of elasticity of the pipeline material in kg/cm$^2$,
$I$ = linear moment of inertia of the pipeline in cm$^4$,
$q$ = net weight of the pipeline (with fluidization device) relative to the fluidized bottom per unit of length of the pipeline in kg/cm,
$l$ = length of the fluidized bottom adjacent to the pipeline in cm,
$z$ = desired depth of burying the pipeline (lower surface of pipe) in cm,
$C$ = a dimensionless constant having a value of about 60.

The minimum length ($L$) of the fluidization device is defined by the formula:

$$L = \sqrt[4]{\frac{CEIz}{q}}$$

wherein $E$, $I$, $z$ and $q$ have the same meaning as indicated above, $L$ is the minimum length of the fluidization device and $C$ is a constant having a value of about 20.

If a composite pipe is used, for example a steel pipe having a concrete coating on the outside, the minimum length of the bottom material to be fluidized is defined by the formula:

$$l = \sqrt[4]{\frac{CSz}{q}}$$

wherein
$S$ = the total stiffness of the pipe, $E_cI_c + E_sI_s$,
$E_c$ = the modulus of elasticity of the concrete coating in kg/cm$^2$,
$I_c$ = the linear moment of inertia of the concrete coating in cm$^4$,
$E_s$ = the modulus of elasticity of the pipe material in kg/cm$^2$,
$I_s$ = the linear moment of inertia of the steel pipe in cm$^4$,
$q$ = net weight of the pipeline (with coating and fluidization device) relative to the fluidized bottom per unit of length of the pipeline in kg/cm,
$l$ = length of the fluidized bottom adjacent to the pipeline in cm,
$z$ = desired depth of burying the pipeline in cm,
$C$ = a dimensionless constant having a value of about 60.

Then the minimum length ($L$) of the fluidization device is defined by the formula:

$$L = \sqrt[4]{\frac{CSz}{q}}$$

wherein
$S$, $z$ and $q$ have the same meaning as indicated above, $L$ is the minimum length of the fluidization device and $C$ is a dimensionless constant having a value of about 20.

We claim as our invention:

1. Apparatus for burying a pipeline in the bottom of a body of water by fluidization of the bottom material, comprising:
a plurality of parallel pipes, each pipe having a plurality of fluidization openings along the length thereof;
a plurality of spaced yokes or horse-shoe shaped cross-section, each yoke comprising a continuous, curved bottom portion and a pair of substantially straight, substantially parallel arms extending upwardly from the curved bottom portion, the parallel arms being spaced a sufficient distance to accept therebetween a pipeline to be buried;
connecting members, comprising the plurality of pipes, interconnecting the curved bottom portions of the yokes;
each of the plurality of pipes being affixed to the curved bottom portion of each of the yokes;
the yokes being structurally independent on one another except for connecting members connected to the curved bottom portions of the yokes;
closing means releaseably connected between the parallel arms of each of the horse-shoe shaped yokes for axially moveably connecting the horse-shoe shaped yoke to a pipeline to be buried; and
means for supplying a pressurized fluid to each of the plurality of pipes.

2. The apparatus of claim 1 including ballast bars affixed to the yokes for ballasting the apparatus.

3. The apparatus of claim 1 including bearings connected to the yokes for reducing friction as the yokes slide along the pipeline.

* * * * *

PO-1050
(5/69)

UNITED STATES PATENT OFFICE
CERTIFICATE OF CORRECTION

Patent No. _____(US) 3,702,540_____ Dated _____November 14, 1972_____

Inventor(s) _____Johannes Van Steveninck_____

It is certified that error appears in the above-identified patent and that said Letters Patent are hereby corrected as shown below:

Title Page - first column, after line /21/ insert--

FOREIGN APPLICATION PRIORITY DATA
November 12, 1969    Great Britian...55310/69--

Claim 1, column 4, line 32, after "yokes" change "or" to -- of --.

Claim 1, column 4, line 44, after "independent" change "on" to -- of --.

Signed and sealed this 29th day of May 1973.

(SEAL)
Attest:

EDWARD M. FLETCHER, JR.
Attesting Officer

ROBERT GOTTSCHALK
Commissioner of Patents